(12) United States Patent
Takizawa et al.

(10) Patent No.: US 11,462,783 B2
(45) Date of Patent: Oct. 4, 2022

(54) ELECTRIC VEHICLE

(71) Applicant: HONDA MOTOR CO., LTD., Tokyo (JP)

(72) Inventors: Kazuaki Takizawa, Wako (JP); Yoshikazu Onuma, Wako (JP); Noriyasu Hakuta, Wako (JP); Kodai Kasai, Wako (JP); Toru Ogaki, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 130 days.

(21) Appl. No.: 16/902,292

(22) Filed: Jun. 16, 2020

(65) Prior Publication Data

US 2021/0013564 A1  Jan. 14, 2021

(30) Foreign Application Priority Data

Jun. 24, 2019 (JP) .............................. JP2019-116194

(51) Int. Cl.
*H01M 10/6563* (2014.01)
*H01M 10/613* (2014.01)
*H01M 10/625* (2014.01)

(52) U.S. Cl.
CPC ..... *H01M 10/6563* (2015.04); *H01M 10/613* (2015.04); *H01M 10/625* (2015.04)

(58) Field of Classification Search
CPC ........... H01M 10/6563; H01M 10/613; H01M 10/625; H01M 10/486; H01M 10/633; H01M 2220/20; Y02E 60/10; Y02T 10/70; Y02T 10/7072; Y02T 90/14; B60L 58/10; B60L 58/24; B60H 1/00392; B60H 1/00642
See application file for complete search history.

(56) References Cited

U.S. PATENT DOCUMENTS

| | | | |
|---|---|---|---|
| 10,220,828 B2* | 3/2019 | Cho | .................. B60K 6/485 |
| 2011/0253099 A1* | 10/2011 | Han | .................. F02N 19/005 |
| | | | 701/112 |

(Continued)

FOREIGN PATENT DOCUMENTS

| | | | | |
|---|---|---|---|---|
| JP | 2010285110 A | * | 12/2010 | ............... B60L 3/00 |
| JP | 2015-211500 | | 11/2015 | |

(Continued)

OTHER PUBLICATIONS

Japanese Office Action for Japanese Patent Application No. 2019-116194 dated Feb. 9, 2021.

*Primary Examiner* — Kaity V Chandler
(74) *Attorney, Agent, or Firm* — Amin, Turocy & Watson, LLP (57) ABSTRACT

Provided is an electric vehicle equipped with a battery mounted on a vehicle and capable of being charged by supplying electric power from outside of the vehicle; a temperature adjuster configured to adjust a temperature of the battery; and an air conditioner configured to control air-conditioning in a passenger compartment by a predetermined schedule, in which, if both an operating condition of the temperature adjuster and an operating condition of the air conditioner are established, the air conditioner operates after the temperature adjuster operates for a predetermined time.

5 Claims, 4 Drawing Sheets (56) References Cited

U.S. PATENT DOCUMENTS

2014/0214251 A1* 7/2014 Sugiyama ............... B60L 58/20
                                                    903/930
2016/0257299 A1* 9/2016 Ikedaya ................. B60K 6/442

FOREIGN PATENT DOCUMENTS

| JP | 2016-059248 | 4/2016 | |
|----|----|----|----|
| JP | 2016-208639 | 12/2016 | |
| JP | 6183411 | 8/2017 | |
| JP | 2019-088076 | 6/2019 | |
| JP | 2019-169260 | 10/2019 | |
| WO | WO-2017017867 A1 * | 2/2017 | ........ H01M 10/6568 |

\* cited by examiner

ELECTRIC VEHICLE

CROSS-REFERENCE TO RELATED APPLICATION

Priority is claimed on Japanese Patent Application No. 2019-116194, filed Jun. 24, 2019, the content of which is incorporated herein by reference.

BACKGROUND OF THE INVENTION

Field of the Invention

The present invention relates to an electric vehicle.

Description of Related Art

In the related art, a technique in which a battery heater is automatically operated during external charging of an electric vehicle in a low-temperature environment to pre-heat a battery before running of the electric vehicle is known (for example, see Japanese Patent No. 6183411).

SUMMARY OF THE INVENTION

However, in the related art, charging an electric vehicle in consideration of an amount of charging electric power received by the battery in a low-temperature environment is not discussed.

An aspect according to the present invention has been realized in consideration of such circumstances, and an object of the present invention is to provide an electric vehicle in which a sufficient amount of charging electric power can be secured for a battery when charging.

In order to solve the aforementioned problems and achieve the object, the present invention adopts the following aspects.

(1): An electric vehicle according to an aspect of the present invention is equipped with a battery mounted on a vehicle and capable of being charged by supplying electric power from outside of the vehicle; a temperature adjuster configured to adjust a temperature of the battery; and an air conditioner configured to control air-conditioning in a passenger compartment according to a predetermined schedule, in which if both operating conditions of the temperature adjuster and operating conditions of the air conditioner are established, the air conditioner operates after the temperature adjuster has been operating for a predetermined time.

(2): In the aforementioned aspect (1), if both the operating condition of the temperature adjuster and the operating condition of the air conditioner are established, operation start timing of the temperature adjuster and operation start timing of the air conditioner may be determined such that adjustment of the temperature of the battery is completed before a preset scheduled start time of the electric vehicle.

(3): In the aforementioned aspect (1) or (2), the operation of the temperature adjuster may be suspended according to the operation start timing of the temperature adjuster which is set such that adjustment of the temperature of the battery, and air-conditioning in the passenger compartment are completed until the preset scheduled start time of the electric vehicle, after the charging of the battery is completed.

(4) In the aforementioned aspects (1) to (3), a time period during which charging of the battery based on electric power supplied from outside of the vehicle is prohibited may be settable on the basis of a manipulation from a user of the vehicle.

(5) In the aforementioned aspects (1) to (4), an operation aspect of the temperature adjuster and an operation aspect of the air conditioner may be settable on the basis of a manipulation from a user of the vehicle.

According to the aforementioned aspects (1) to (5), it is possible to secure the received amount of the charging electric power of the battery when charging.

DETAILED DESCRIPTION OF THE INVENTION

Hereinafter, an embodiment of the present invention will be described with reference to the drawings.

Figure 1:
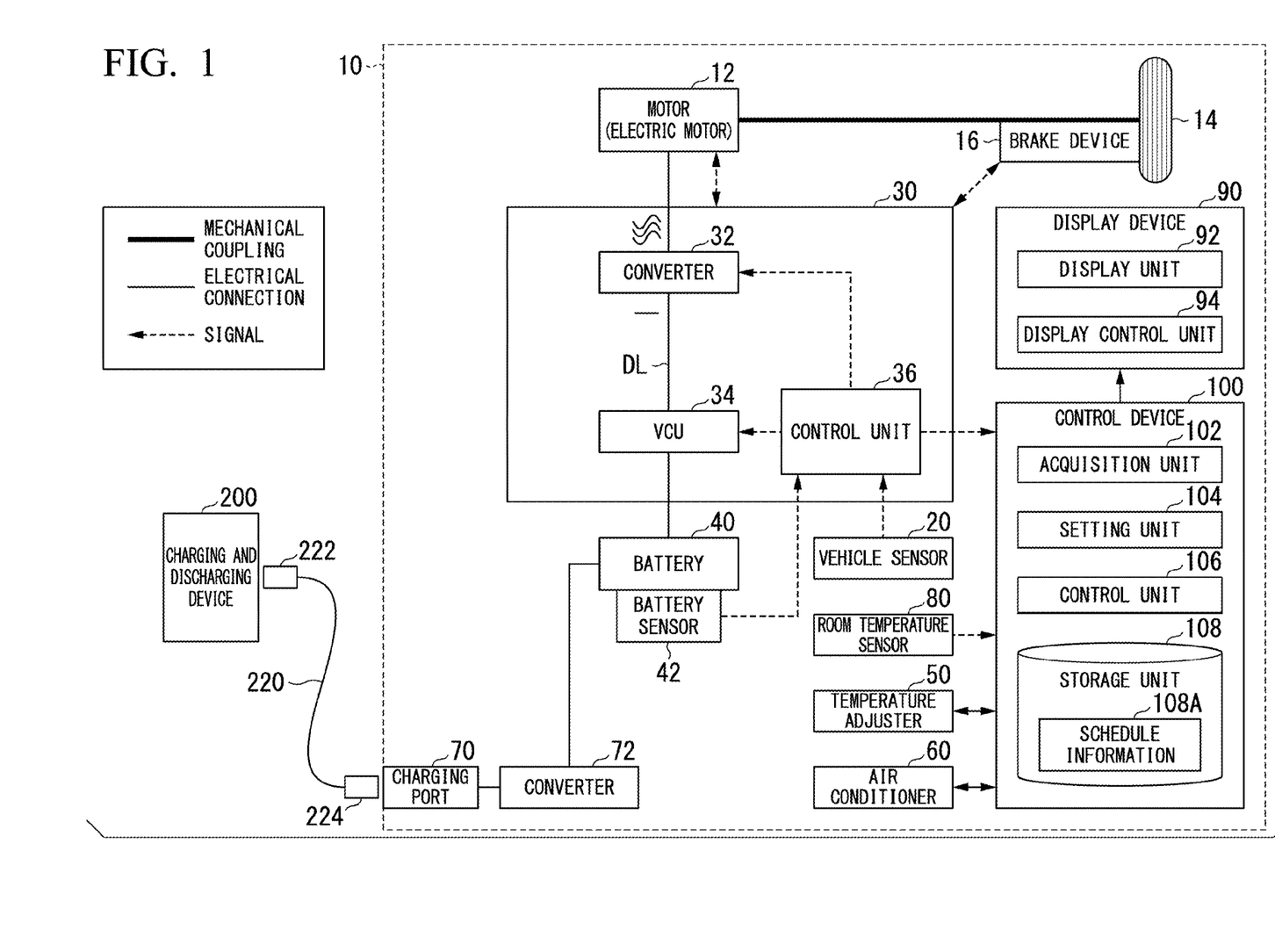
FIG. 1 is a diagram showing an example of a configuration of an electric vehicle according to an embodiment.

FIG. 1 is a diagram showing an example of the configuration of an electric vehicle 10. As shown in FIG. 1, the electric vehicle 10 is equipped with, for example, a motor 12, drive wheels 14, a brake device 16, a vehicle sensor 20, a power control unit (PCU) 30, a battery 40, a battery sensor 42 such as a voltage sensor, a current sensor or a temperature sensor, a temperature adjuster 50, an air conditioner 60, a charging port 70, a converter 72, a room temperature sensor 80, a display device 90, and a control device 100.

The motor 12 is, for example, a three-phase AC motor. A rotor of the motor 12 is connected to the drive wheels 14. The motor 12 outputs power to the drive wheels 14 using the supplied electric power. The motor 12 generates electricity, using kinetic energy of the electric vehicle 10 when the electric vehicle 10 decelerates.

The brake device 16 is equipped with, for example, a brake caliper, a cylinder that transmits hydraulic pressure to the brake caliper, and an electric motor that generates hydraulic pressure in the cylinder. The brake device 16 may be equipped with, as a backup, a mechanism that transmits the hydraulic pressure generated by operating the brake pedal to the cylinder via a master cylinder. The brake device 16 is not limited to the configuration described above, and may be an electronically controlled hydraulic brake device that transmits the hydraulic pressure of the master cylinder to the cylinder.

The vehicle sensor 20 is equipped with an accelerator opening sensor, a vehicle speed sensor, and a brake depression amount sensor. The accelerator opening sensor is attached to the accelerator pedal, detects an operation amount of the accelerator pedal, and outputs the detected operation amount to a control unit 36 as an accelerator opening degree. The vehicle speed sensor is equipped with, for example, a wheel speed sensor and a speed calculator attached to each wheel, combines the wheel speeds detected by the wheel speed sensor to derive the speed (vehicle speed) of the electric vehicle 10, and outputs the speed to the control unit 36. The brake depression amount sensor is attached to the brake pedal, detects an operation amount of the brake pedal, and outputs the detected operation amount to the control unit 36 as a brake depression amount.

The PCU 30 is equipped with, for example, a converter 32, a voltage control unit VCU (34), and a control unit 36. The arrangement of the constituent elements as a unit as the PCU 30 is merely an example, and the constituent elements may be disposed in a dispersed manner.

The converter 32 is, for example, an AC-DC converter. A DC side terminal of the converter 32 is connected to a DC link DL. The battery 40 is connected to the DC link DL via the VCU 34. The converter 32 converts AC generated by the motor 12 into DC and outputs the DC to the DC link DL.

The VCU 34 is, for example, a DC-DC converter. The VCU 34 boosts the electric power supplied from battery 40 and outputs the boosted electric power to the DC link DL.

The control unit 36 is equipped with, for example, a motor control unit, a brake control unit, and a battery/VCU control unit. The motor control unit, the brake control unit, and the battery/VCU control unit may be replaced with separate control devices, for example, control devices such as a motor ECU, a brake ECU, and a battery ECU, respectively.

The control unit 36 controls the motor 12 on the basis of the output of the vehicle sensor 20 in the motor control unit. The control unit 36 controls the brake device 16 on the basis of the output of the vehicle sensor 20 in the brake control unit. The control unit 36 calculates the state of charge (SOC; hereinafter also referred to as "battery charge rate") of the battery 40 on the basis of the output of the battery sensor 42 attached to the battery 40 in the battery/VCU control unit and outputs the SOC to the VCU 34 and the control device 100. The control unit 36 outputs information on the vehicle speed, according to the vehicle speed which is output by the vehicle sensor 20, to the control device 100. The VCU 34 increases the voltage of the DC link DL, depending on an instruction from the battery/VCU control.

The battery 40 is, for example, a secondary battery such as a lithium ion battery. The battery 40 is mounted on the electric vehicle 10, can be charged by supplying electric power from a charging and discharging device 200 outside the electric vehicle 10, and performs discharging for running of the electric vehicle 10. The battery sensor 42 is equipped with, for example, a current sensor, a voltage sensor, and a temperature sensor. The battery sensor 42 detects, for example, a current value, a voltage value, and a temperature of the battery 40. The battery sensor 42 outputs the detected current value, voltage value, temperature, and the like to the control unit 36.

When the operating conditions are established, the temperature adjuster 50 heats the battery 40 to increase the temperature. The operating conditions of the temperature adjuster 50 have been established, for example, when a charge reservation of the battery 40 is set on condition that the temperature of the battery 40 is lower than a threshold value and when a time a fixed time immediately before the preset start time is reached.

The air conditioner 60 has a "timer air conditioner" function of performing air-conditioning in the passenger compartment according to a desired schedule. The air conditioner 60 operates the "timer air conditioner" function, for example, when a scheduled time set in advance by a user of the electric vehicle 10 is reached, and adjusts the state of the air in the passenger compartment, thereby adjusting the environment in the passenger compartment.

The charging port 70 is provided on the outside of a vehicle body of the electric vehicle 10. The charging port 70 is connected to the charging and discharging device 200 via a charging cable 220. The charging cable 220 is equipped with a first plug 222 and a second plug 224. The first plug 222 is connected to the charging and discharging device 200, and the second plug 224 is connected to the charging port 70. Electricity supplied from the charging and discharging device 200 is supplied to the charging port 70 via the charging cable 220.

The charging cable 220 includes a signal cable attached to an electric power cable. The signal cable mediates communication between the electric vehicle 10 and the charging and discharging device 200. Therefore, each of the first plug 222 and the second plug 224 is provided with an electric power connector for connecting the electric power cable and a signal connector for connecting a signal cable.

The converter 72 is provided between the charging port 70 and the battery 40. The converter 72 converts a current, for example, an alternating current, to be introduced from the charging and discharging device 200 via the charging port 70, into a current for supplying to the battery 40, for example, a direct current. The converter 72 outputs the converted DC to the battery 40.

The room temperature sensor 80 is mounted, for example, inside a lower part of an instrument panel, and measures the temperature (room temperature) in the passenger compartment of the electric vehicle 10. The room temperature sensor 80 outputs information on the measured temperature in the passenger compartment to the control device 100.

The display device 90 is equipped with a display unit 92 and a display control unit 94. The display unit 92 displays information according to the control of the display control unit 94. The display control unit 94 causes the display unit 92 to display information that is output by the control device 100, for example, information on a cruising distance. The cruising distance refers to a distance over which the electric vehicle 10 is runnable with the electric power of the battery 40. In the display device 90, the information based on the power consumption of the battery 40 may be information other than the cruising distance of the electric vehicle 10, for example, information such as a state of deterioration of the battery 40.

The control device 100 is equipped with, for example, an acquisition unit 102, a setting unit 104, a control unit 106, and a storage unit 108. The acquisition unit 102, the setting unit 104, and the control unit 106 are realized, for example, when a hardware processor such as a central processing unit (CPU) executes a program (software). Some or all of these constituent elements may be realized by hardware (a circuit unit including circuitry) such as a large scale integration (LSI), an application specific integrated circuit (ASIC), a field-programmable gate array (FPGA), and a graphics processing unit (GPU), or may be realized by cooperation of software and hardware. The program may be stored in advance in a storage device (non-transitory storage medium) such as a hard disk drive (HDD) or a flash memory, or may be stored in a detachable storage medium (non-transitory storage medium) such as a DVD or a CD-ROM, and may be installed when the storage medium is mounted on the drive device. The storage unit 108 is realized by an HDD, a flash memory, a random access memory (RAM), or the like. The storage unit 108 stores, for example, schedule information 108A. For example, the schedule for performing the "timer air conditioner" function of the air conditioner 60 is set in the schedule information 108A.

The acquisition unit 102 acquires, for example, information which is output by the control unit 36, such as information on the SOC of the battery 40 and the vehicle speed of the electric vehicle 10. The acquisition unit 102 acquires, for example, information on the temperature in the passenger compartment that is output from the room temperature sensor 80.

The setting unit 104 is able to set a time zone at which charging of the battery 40 based on electric power supplied from the outside of the electric vehicle 10 is prohibited, on the basis of a manipulation from the user of the electric vehicle 10. The setting unit 104 is able to set the operation aspect of the temperature adjuster 50 and the operation aspect of the air conditioner 60, on the basis of the manipulation from the user of the electric vehicle 10. The operation aspect of the temperature adjuster 50 is determined by, for example, the heating temperature, the heating time and the like of the battery 40. The operation aspect of the air conditioner 60 is determined by, for example, the amount of air blown into the passenger compartment, the air blowing time, and the like.

The control unit 106 determines whether the operating condition of the temperature adjuster 50 is established. For example, when the charging of the battery 40 is started, the control unit 106 determines that the operating condition of the temperature adjuster 50 is established. For example, if the scheduled start time of the electric vehicle 10 is set in advance, when a fixed time before the scheduled start time is reached, the control unit 106 may determine that the operating condition of the temperature adjuster 50 is established.

The control unit 106 determines whether the operating condition of the air conditioner 60 is established. The control unit 106 determines whether the operating condition of the air conditioner 60 is established, for example, on the basis of the schedule information 108A acquired from the storage unit 108. The control unit 106 instructs the temperature adjuster 50 to operate when only the operating condition of the temperature adjuster 50 is established. The control unit 106 instructs the air conditioner 60 to operate when only the operating condition of the air conditioner 60 is established. When both the operating condition of the temperature adjuster 50 and the operating condition of the air conditioner 60 are established, the control unit 106 gives instructions to the temperature adjuster 50 or the air conditioner 60 to operate the temperature adjuster 50 for a predetermined period of time, and then operate the air conditioner 60.

When the scheduled start time of the electric vehicle 10 is set in advance, the control unit 106 determines the operation start timing of the temperature adjuster 50 and the operation start timing of the air conditioner 60 such that the adjustment of temperature of the battery 40 is completed until the preset scheduled start time of the electric vehicle 10. After the charging of the battery 40 is completed, when there is a fixed time or more until the preset scheduled start time of the electric vehicle 10, the control unit 106 suspends the operation of the temperature adjuster 50 until a blank period elapses. The blank period is, for example, a period from the timing when the charging of the battery 40 is completed to the operation start timing of the temperature adjuster 50 which is set such that adjustment of the temperature of the battery 40 and the air-conditioning in the passenger compartment are completed.

When the blank period elapses after the operation of the temperature adjuster 50 is suspended, if the temperature of the battery 40 is equal to or higher than a predetermined temperature, the control unit 106 waits for the operation of the temperature adjuster 50, and then operates the air conditioner 60. On the other hand, when the blank period elapses after the operation of the temperature adjuster 50 is suspended, if the temperature of the battery 40 is less than the predetermined temperature, the control unit 106 operates the temperature adjuster 50 for a predetermined time, and then operates the air conditioner 60.

[Processing Flow of Control Unit]

Figure 2:
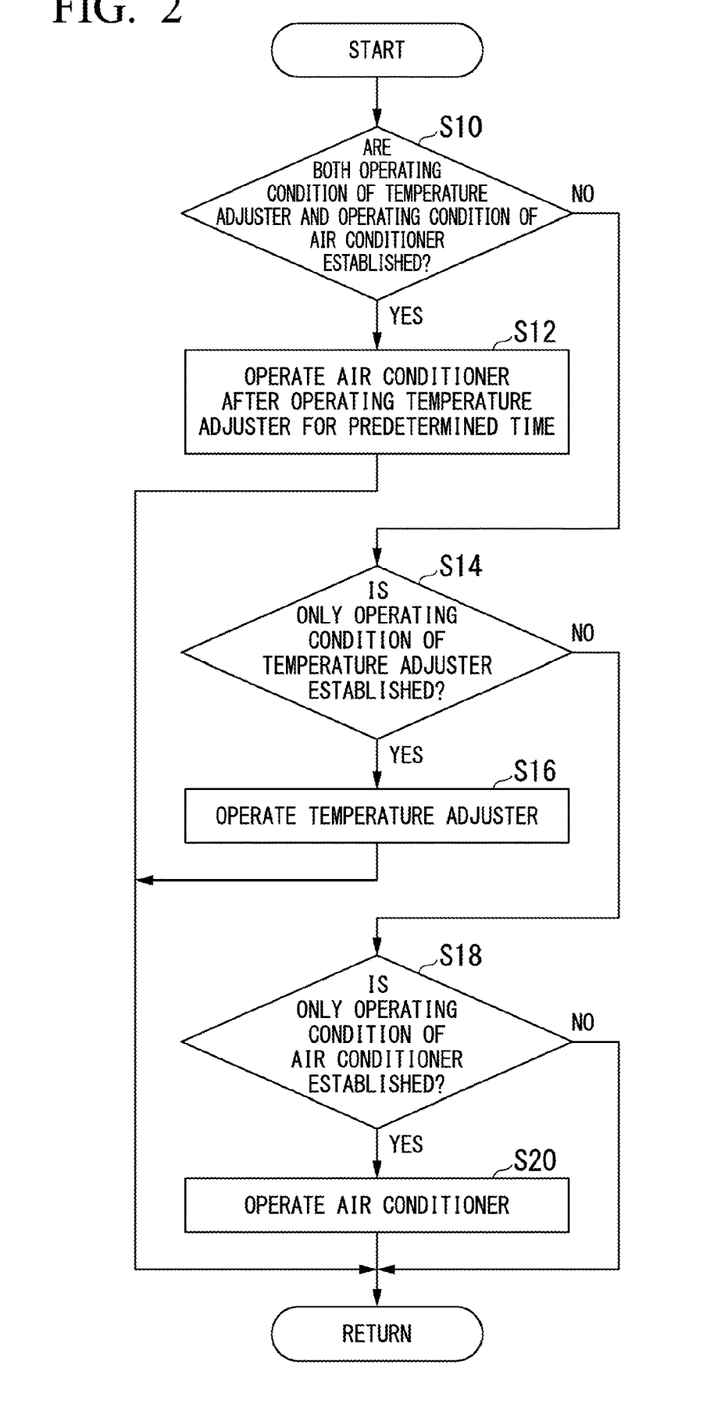
FIG. 2 is a flowchart for explaining a flow of a series of processes of the electric vehicle according to the embodiment.
Figure 3:
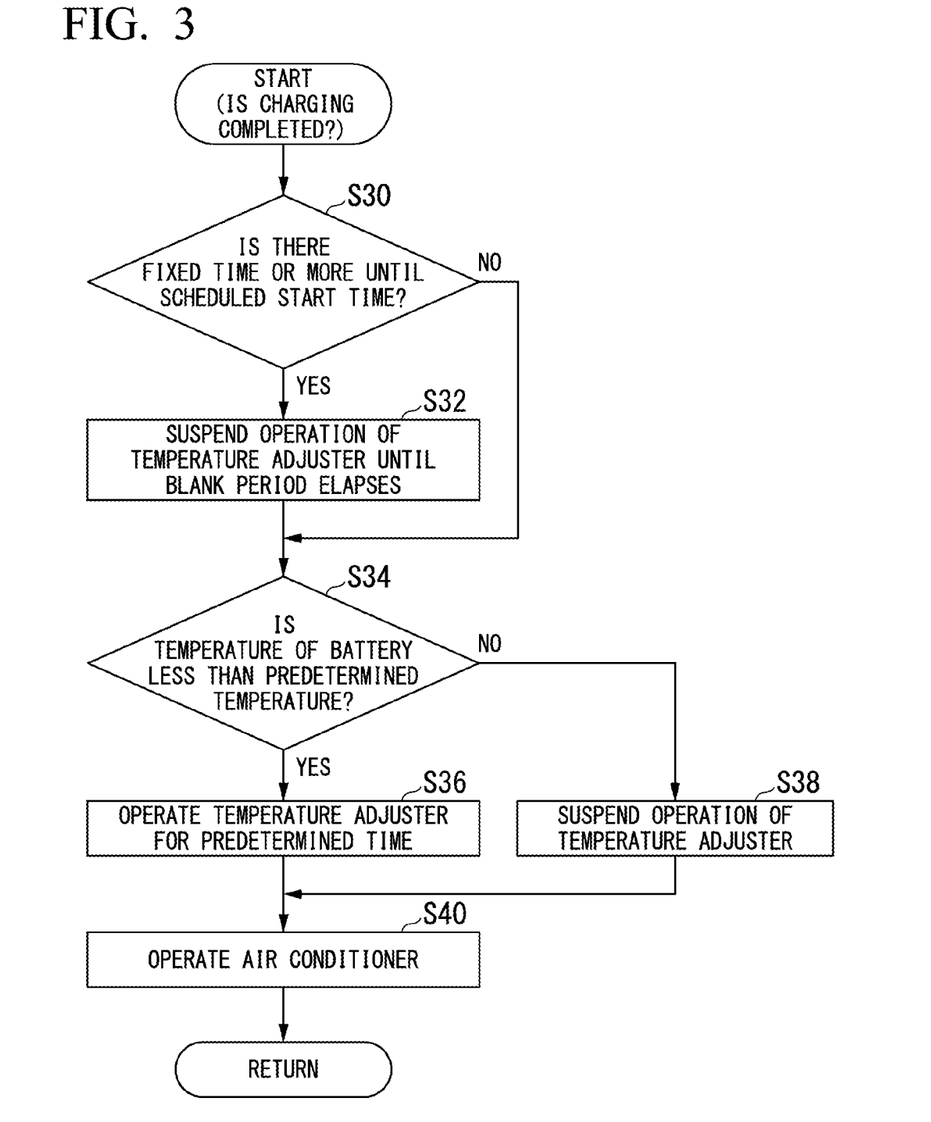
FIG. 3 is a flowchart for explaining a flow of a series of processes of the control device according to the embodiment.

Hereinafter, a flow of a series of processes of the control device 100 according to the embodiment will be described using a flowchart. FIG. 2 is a flowchart showing an example of an operation process of the temperature adjuster 50 or the air conditioner 60. FIG. 3 is a flowchart showing another example of the operation process of the temperature adjuster 50 or the air conditioner 60.

First, the flowchart shown in FIG. 2 will be described. The process of the flowchart shown in FIG. 2 may be executed, for example, when charging of the electric vehicle 10 is started.

The control device 100 determines whether both the operating condition of the temperature adjuster 50 and the operating condition of the air conditioner 60 are established (step S10). If it is determined that both the operating condition of the temperature adjuster 50 and the operating condition of the air conditioner 60 are established, the control device 100 operates the temperature adjuster 50 for a predetermined time and then operates the air conditioner 60 (step S12). Thus, the process of this flowchart ends. On the other hand, when it is determined that both the operating condition of the temperature adjuster 50 and the operating condition of the air conditioner 60 are not established, the control device 100 determines whether only the operating condition of the temperature adjuster 50 is established (step S14). If it is determined that only the operating condition of the temperature adjuster 50 is established, the control device 100 operates the temperature adjuster 50 (step S16). Thus, the process of this flowchart ends. On the other hand, if it is determined that only the operating condition of the temperature adjuster 50 is not established, the control device 100 determines whether only the operating condition of the air conditioner 60 is established (step S18). If it is determined that only the operating condition of the air conditioner 60 is established, the control device 100 operates the air conditioner 60 (step S20). Thus, the process of this flowchart ends.

Next, the flowchart shown in FIG. 3 will be described. The process of the flowchart shown in FIG. 3 may be executed, for example, when charging of the electric vehicle 10 is completed.

The control device 100 determines whether there is a fixed time or more until the scheduled start time of the electric vehicle 10 (step S30). If it is determined that there is a fixed time or more until the scheduled start time of the electric vehicle 10, the control device 100 suspends the operation of the temperature adjuster 50 until the blank period elapses (step S32). Next, the control device 100 determines whether the temperature of the battery 40 is less than a predetermined temperature (step S34). When it is determined that there is not a fixed time or more until the scheduled start time of the electric vehicle 10, the control device 100 determines whether the temperature of the battery 40 is less than the predetermined temperature without going through the process of step S32 (step S34). If it is determined that the temperature of the battery 40 is less than the predetermined temperature, the control device 100 operates the temperature adjuster 50 for a predetermined time (step S36), and then operates the air conditioner 60 (step S40). Thus, the process of this flowchart ends. On the other hand, if it is determined that the temperature of the battery 40 is equal to or higher than the predetermined temperature, the control device 100 suspends the operation of the temperature adjuster 50 until the operation start timing of the air conditioner 60 is reached without operating the temperature adjuster 50 (step S38), and then, operates the air conditioner 60 (step S40). Thus, the process of this flowchart ends.

Figure 4:
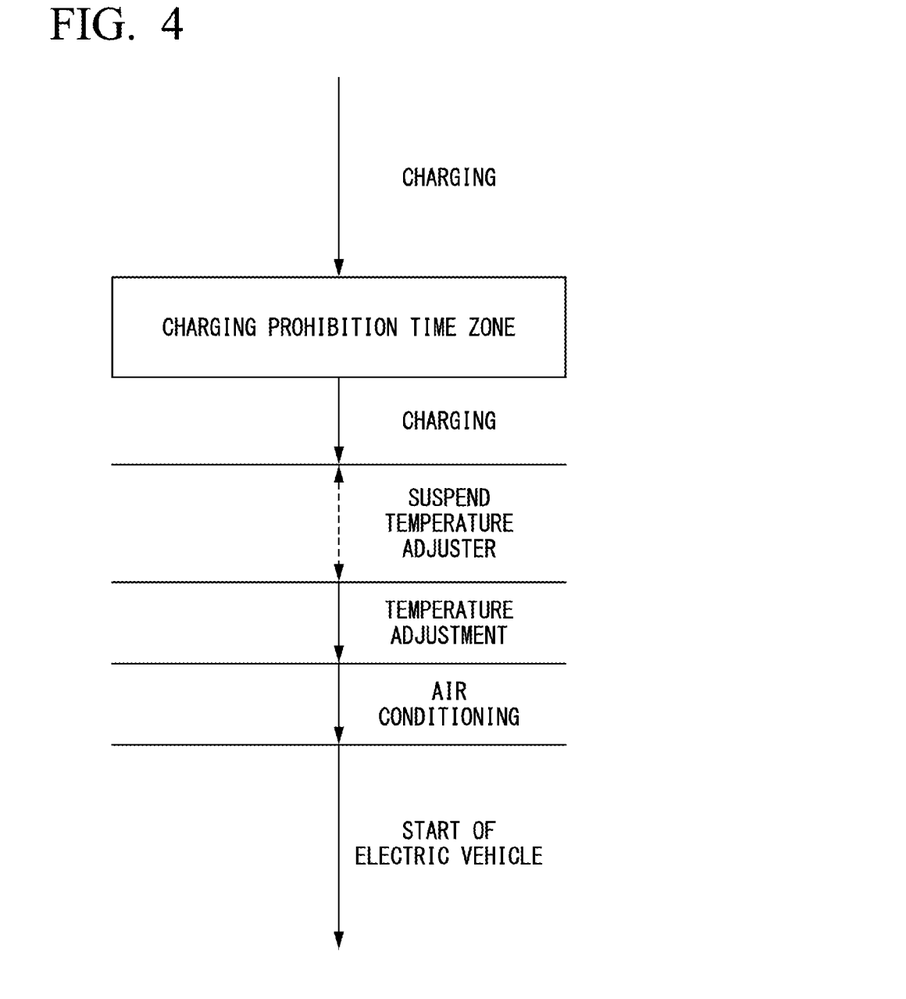
FIG. 4 is a diagram for explaining an example of an operation of the electric vehicle according to the embodiment.

FIG. 4 is a diagram for explaining the operation of the electric vehicle 10 according to the embodiment. In the shown example, a case in which the temperature adjuster 50 or the air conditioner 60 is operated after the charging of the electric vehicle 10 is completed and before starting of the electric vehicle 10 begins will be described as an example.

When the charging period of the battery 40 extends over the charging prohibition time zone, the electric vehicle 10 charges the battery 40 to avoid the charging prohibition time zone. When the charging of the battery 40 is completed, if there is a predetermined time or more until the scheduled start time of the electric vehicle 10, until the operation start timing of the temperature adjuster 50 is reached, the electric vehicle 10 suspends the operation of the temperature adjuster 50. In the shown example, the operation start timing of the temperature adjuster 50 is calculated by back calculation from the start time of the electric vehicle 10 such that the temperature adjustment in the passenger compartment by the temperature adjuster 50 and the air-conditioning by the air conditioner 60 are completed until the start time of the electric vehicle 10. When the operation start timing of the temperature adjuster 50 is reached, the electric vehicle 10 operates the temperature adjuster 50 for a predetermined time, and then operates the air conditioner 60. Thereafter, departure of the electric vehicle 10 may be initiated by the user.

According to the electric vehicle 10 according to the above-described embodiment, it is possible to secure the received amount of charging electric power of the battery 40 when charging. For example, when the electric vehicle 10 is placed in a low-temperature environment, there is a case in which the temperature of the battery 40 may decrease, and it is not be possible to secure the received amount of charging electric power of the battery 40 when charging. Therefore, according to the electric vehicle 10 according to the embodiment, when charging of the electric vehicle 10 is started, if the temperature of the battery 40 is less than the predetermined temperature, the battery 40 is heated by the temperature adjuster 50 for a predetermined time, and thereafter, air-conditioning in the passenger compartment is performed by the air conditioner 60. Therefore, it is possible to secure the received amount of charging electric power of the battery 40 when charging.

According to the electric vehicle 10, the temperature of the battery 40 can be efficiently adjusted by the temperature adjuster 50. For example, when the temperature adjuster 50 is operated early even though there is a predetermined time or more until the preset scheduled start time of the electric vehicle 10, it is necessary to continue adjusting the temperature of the battery 40 by the temperature adjuster 50 until the start time of the electric vehicle 10 is reached. Therefore, according to the electric vehicle 10 according to the embodiment, if there is a predetermined time or more until the preset scheduled start time of the electric vehicle 10, the operation of the temperature adjuster 50 is temporarily suspended, until the operation start timing of the temperature adjuster 50 is reached. Therefore, the temperature of the battery 40 can be efficiently adjusted by the temperature adjuster 50.

<Modified Example of the Embodiment>

In the aforementioned embodiment, the temperature adjuster 50 may determine whether the operating condition of the temperature adjuster 50 is established and whether the operating condition of the air conditioner 60 is established, and may mediate the operation between the temperature adjuster 50 and the air conditioner 60, on the basis of the determined result thereof. The air conditioner 60 may determine whether the operating condition of the temperature adjuster 50 is established and whether the operating condition of the air conditioner 60 is established, and may mediate the operation between the temperature adjuster 50 and the air conditioner 60, on the basis of the determined result thereof.

As described above, although the embodiments for carrying out the present invention have been described using the embodiments, the present invention is not limited to these embodiments at all, and various modifications and substitutions may be made without departing from the gist of the present invention.

What is claimed is:

1. An electric vehicle comprising:
a battery mounted on a vehicle and capable of being charged by supplying electric power from outside of the vehicle;
a temperature adjuster configured to adjust a temperature of the battery;
an air conditioner configured to control air-conditioning in a passenger compartment by a predetermined schedule; and
a processor,
wherein if both an operating condition of the temperature adjuster and an operating condition of the air conditioner are established, the processor is configured to operate the air conditioner after the temperature adjuster for a predetermined time,
wherein, after a charging of the battery is completed, when there is a fixed time or more until a preset scheduled start time of the vehicle, the processor is configured to suspend operation of the temperature adjuster until a predetermined period elapses,
wherein, in a time when the predetermined period has elapsed after the processor suspends the operation of the temperature adjuster, the processor determines that a temperature of the battery is less than a predetermined temperature, the processor is configured to operate the temperature adjuster for the predetermined time and then operates the air conditioner, and
wherein, in the time when the predetermined period has elapsed after the processor suspends the operation of the temperature adjuster, the processor determines that the temperature of the battery is equal to or higher than the predetermined temperature, the processor is configured to operate the air conditioner without operating the temperature adjuster.

2. The electric vehicle according to claim 1, wherein if both the operating condition of the temperature adjuster and the operating condition of the air conditioner are established, the processor is configured to determine operation start timing of the temperature adjuster and operation start timing of the air conditioner such that adjustment of the temperature of the battery is completed until the preset scheduled start time.

3. The electric vehicle according to claim 2, wherein the predetermined period is a period from a timing when the charging of the battery is completed to the operation start timing of the temperature adjuster.

4. The electric vehicle according to claim 1, wherein the processor is configured to set a time zone at which charging of the battery based on electric power supplied from the outside of the vehicle is prohibited on the basis of a manipulation from a user of the vehicle.

5. The electric vehicle according to claim 1, wherein the processor is configured to set an operation aspect of the temperature adjuster and an operation aspect of the air conditioner on the basis of a manipulation from a user of the vehicle.

\* \* \* \* \*